(No Model.)  
6 Sheets—Sheet 2.

L. J. HIRT.
TACK MACHINE.

No. 355,610. Patented Jan. 4, 1887.

WITNESSES  
INVENTOR  
Louis J. Hirt  
By Geo. B. Selden,  
Attorney (No Model.)  L. J. HIRT.  6 Sheets—Sheet 3.
TACK MACHINE.

No. 355,610.  Patented Jan. 4, 1887.

(No Model.)    6 Sheets—Sheet 4.
L. J. HIRT.
TACK MACHINE.

No. 355,610.    Patented Jan. 4, 1887.

WITNESSES
A. Gorge Jr.
H.G. Phillips.

INVENTOR
Louis J. Hirt
By Geo. B. Selden
Attorney (No Model.) 6 Sheets—Sheet 5.
L. J. HIRT.
TACK MACHINE.
No. 355,610. Patented Jan. 4, 1887.
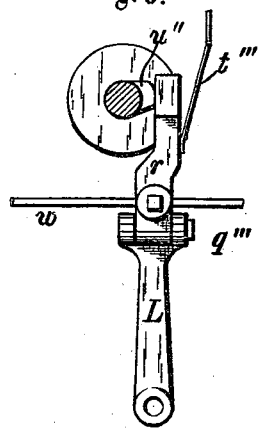
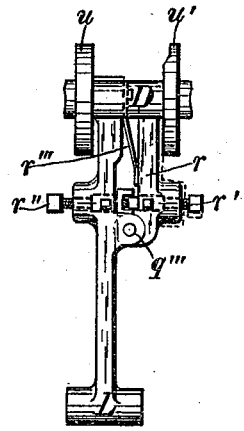
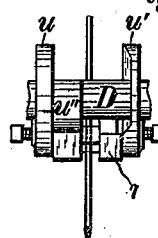
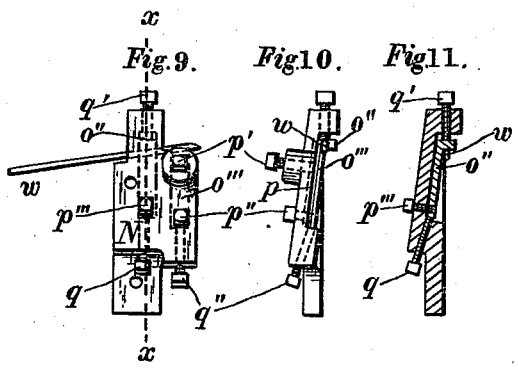
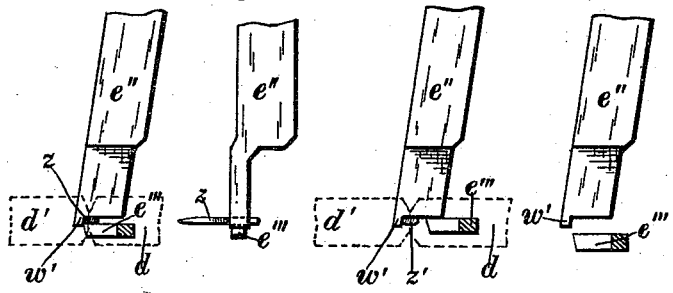
Witnesses
A. Sorge Jr.
H. G. Phillips.
Inventor
Louis J. Hirt
By his Attorney
Geo. B. Selden.

(No Model.) 6 Sheets—Sheet 6.

L. J. HIRT.
TACK MACHINE.

No. 355,610. Patented Jan. 4, 1887.

Witnesses
A. Sorge Jr.
H.G. Phillips.

Inventor.
Louis J. Hirt,
By his Attorney
Geo. B. Selden

UNITED STATES PATENT OFFICE.

LOUIS J. HIRT, OF ROCHESTER, NEW YORK, ASSIGNOR TO THE STANDARD NAIL AND TACK COMPANY, OF SACO, MAINE.

TACK-MACHINE.

SPECIFICATION forming part of Letters Patent No. 355,610, dated January 4, 1887.

Application filed July 21, 1886. Serial No. 208,585. (No model.)

*To all whom it may concern:*

Be it known that I, LOUIS J. HIRT, a citizen of the Republic of France, residing at Rochester, in the county of Monroe, in the State of New York, have invented certain Improvements in Tack-Machines, of which the following is a specification, reference being had to the accompanying drawings.

My invention relates to certain improvements in tack-machines, which improvements are fully described and illustrated in the following specifications and accompanying drawings, and the novel features thereof specified in the claims annexed to the said specification.

Figure 1:
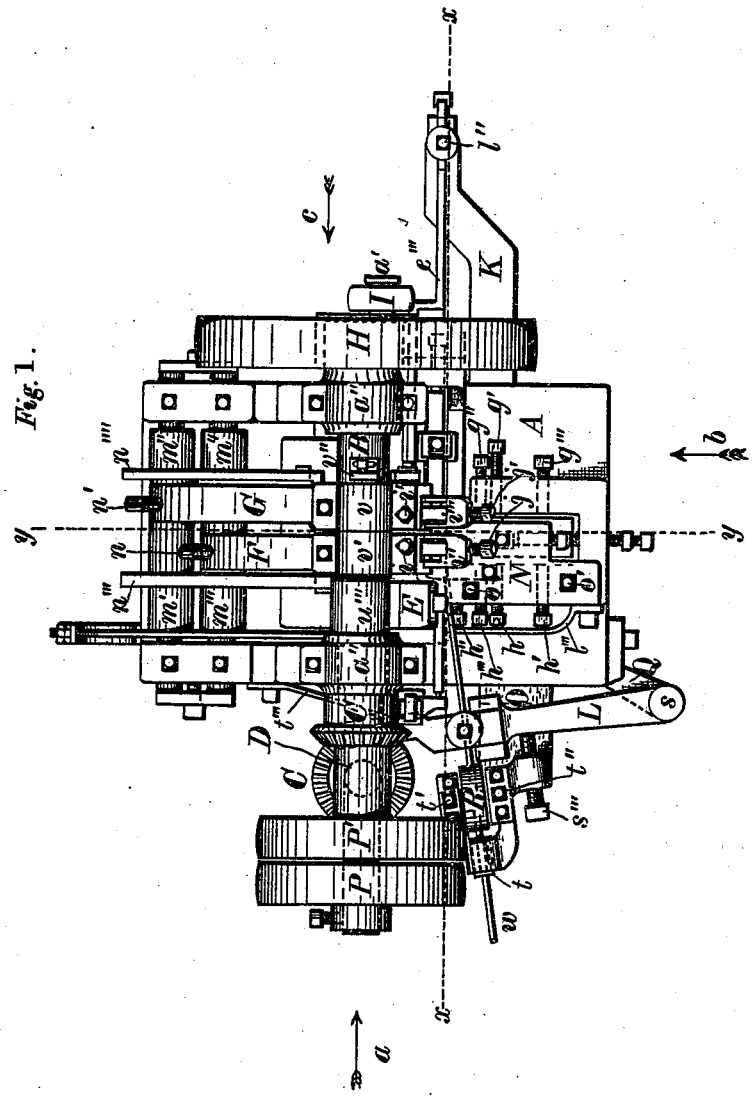
Figure 2:
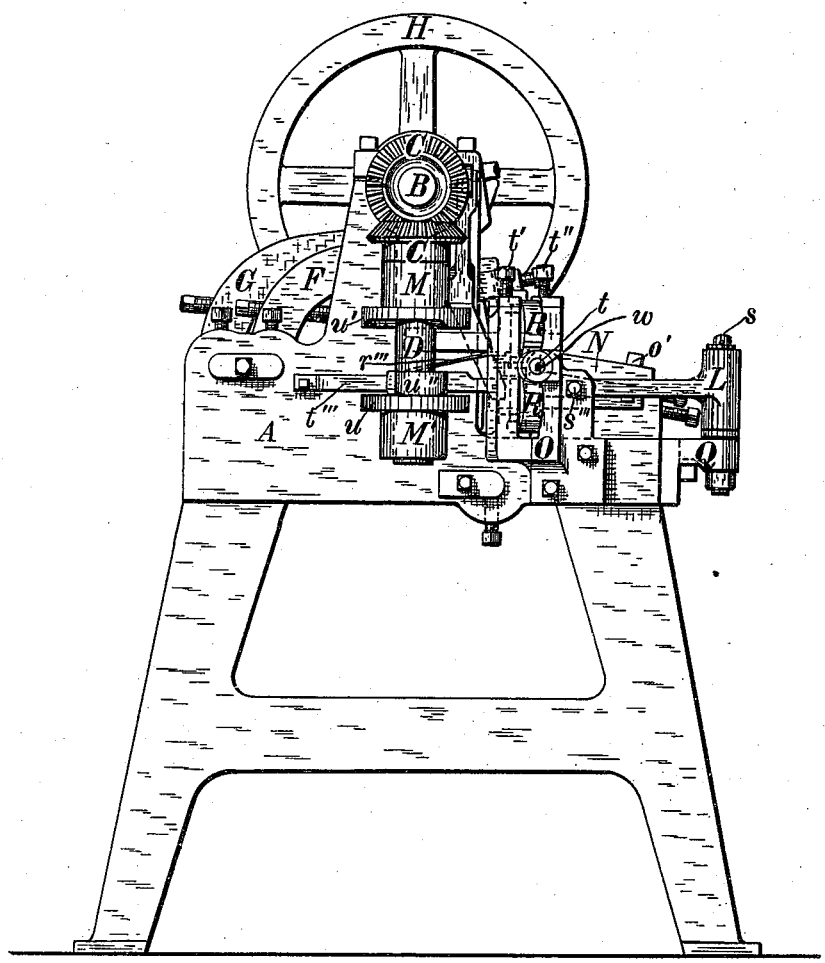
Figure 3:
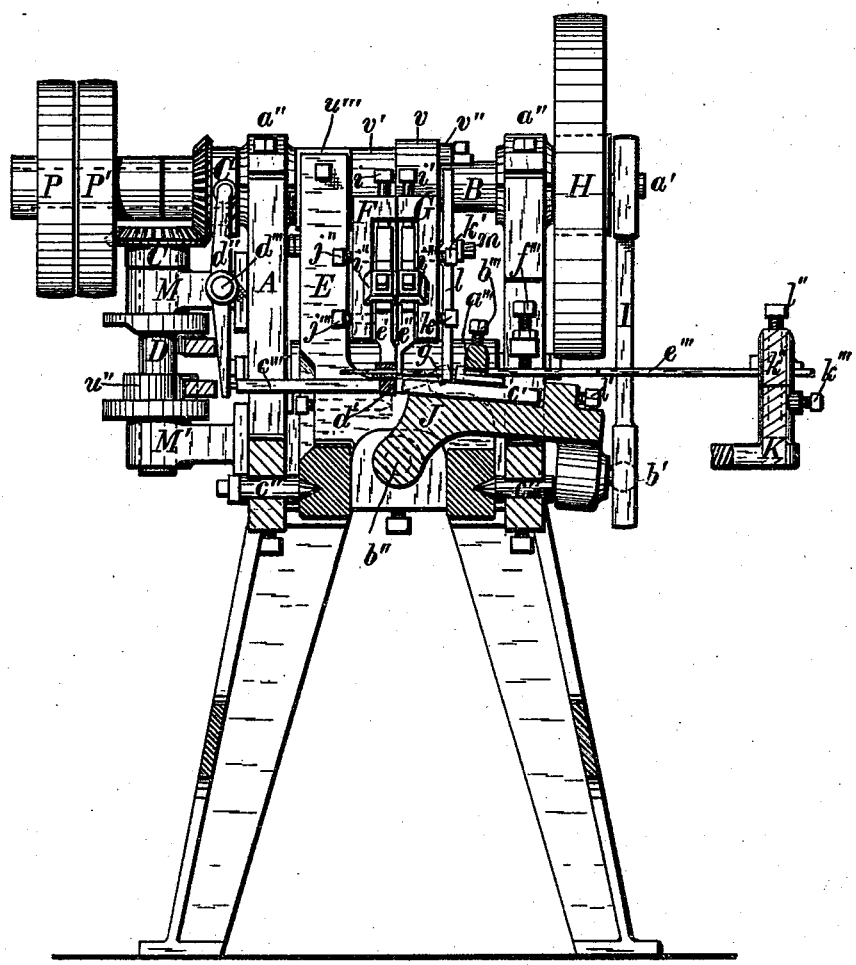
Figure 4:
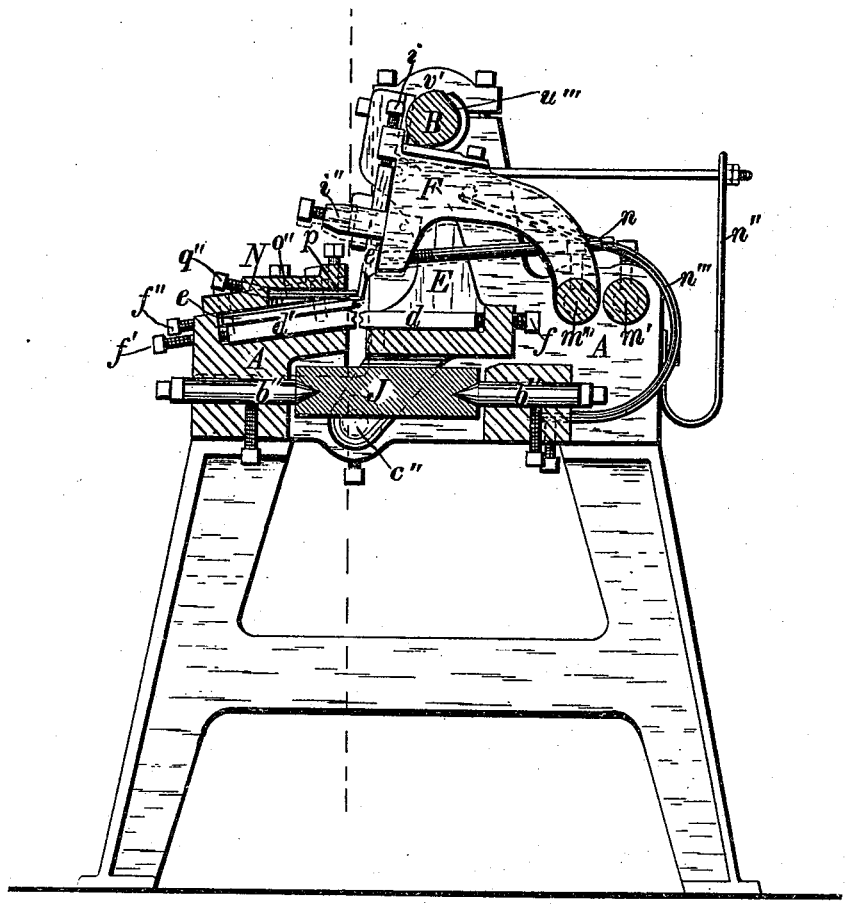
Figure 22:
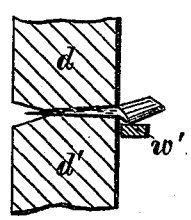
Figure 21:
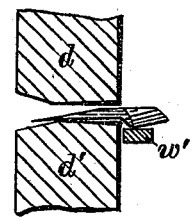
Figure 23:
Figure 24:
Figure 25:
Figure 26:
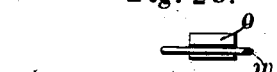
Figure 27:
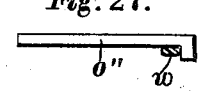
Figure 28:
Figure 29:

In the accompanying drawings, representing my improvements in tack-machines, Figure 1 is a complete plan view of my machine. Fig. 2 is a side elevation viewed in the direction of the arrow *a*, with the driving-pulleys removed. Fig. 3 is a sectional elevation through the line *x x*, Fig. 1, viewed in the direction of the arrow *b*. Fig. 4 is another sectional elevation through the line *y y*, Fig. 1, as viewed in the direction of the arrow *c*. Fig. 5 is a plan view of the wire-feeding mechanism detached. Fig. 6 is a side elevation of the same as viewed from the right side of Fig. 5. Fig. 7 is a plan view of the feeding mechanism as viewed from the top in Fig. 6. Fig. 8 is an enlarged view of the wire jaws. Fig. 9 is a plan view of the wire-supporting mechanism detached. Fig. 10 is a side elevation of the same as viewed from the right side of Fig. 9. Fig. 11 is a sectional elevation on the line *x x*, Fig. 9, showing the parts to the left of that line. Fig. 12 is a side view showing part of the traveling cutter and the blank-holding spring as applied or used in the ordinary tack-machine. Fig. 13 is a partial side elevation of the traveling cutter or carrier with part of blank-holding spring as viewed in the machine when looking in the direction of the arrow *c*. Fig. 14 is a front elevation of the same. Fig. 15 is a side elevation of the carrier viewed from the same position as in Fig. 13, but showing the blank-holding spring withdrawn to allow the return of the carrier to take place without disturbing the blank in the grippers. Fig. 16 shows the carrier and holding-spring in position to receive the flattened wire before it is cut. Figs. 17, 18, 19, and 20 show how the wire is acted upon by the cutter and carrier. Fig. 21 represents parts of the grippers and the form of the blank before the grippers are closed. Fig. 22 represents the same when the grippers are closed. Fig. 23 shows the manner of cutting the wire, the angle of the diagonal lines varying according to the length of the point desired. Fig. 24 is a sectional view of the wire. Fig. 25 represents the various shape of tacks which may be made by my machine. Fig. 26 is an end view of the guiding-block detached. Fig. 27 is a side view of the same. Fig. 28 is a side view of the wire-supporting blocks. Fig. 29 is an end view of the same.

In the accompanying drawings, representing my improvements in tack-machines, A is the bed or frame of the machine, which supports the various operative parts.

B is the main driving-shaft, arranged to revolve in the journal-boxes *a'' a''*, and provided with the tight and loose pulleys P P', through which it receives power.

In the operation of the machine the wire is fed into the machine by the feeding mechanism L, severed on diagonal lines, as represented in Fig. 23, into suitable blanks, which are carried by the traveling carrier *e''*, Figs. 3, 13, 14, 15, and 16, and inserted between the grippers *d d'*, by which the shanks of the blanks are held while the heads are formed by the heading-die *c'*, Fig. 3, so as to produce finished tacks of substantially such forms as are shown in Figs. 25, 1, 2, and 3. Previous to its entrance into the machine the wire is subjected to the action of the flattening-rollers R R, Figs. 1 and 2, which are supported in proper relation with the feeding mechanism by the arm or bracket O, attached to the bed-plate. The wire is guided between the rolls by the guide or socket *t*, Figs. 1 and 2, carried by the arm O. The rollers R R are mounted on shafts which revolve in suitable adjustable boxes supported by the bracket O, provision being made for adjusting the rolls relatively to each other, so as to vary the amount of flattening given to the wire by the set-screws *t' t''*, Figs. 1 and 2. The flattening-rollers being attached to the machine itself, enable me to give the wire the exact shape required in making various forms of nails. The surfaces of the rolls may be gooved, if preferred, where it is desired to use a wire of oval or other section.

The feeding mechanism used in my present machine is substantially like that described in my Patent No. 341,658, dated May 11, 1886, being shown in detail in Figs. 5, 6, 7, and 8 of the accompanying drawings. It consists, essentially, of a swinging lever, L, pivoted to the bed and supporting an arm, $r$, pivoted to the lever L, and the feeding-jaws $s'$ $s''$. The lever L receives a vibratory movement from the cam $u''$, Figs. 2, 3, and 5, on the shaft D, which is driven from the main shaft B by the bevel-gears C C'. A spring, $t'''$, Fig. 5, serves to give the return movement to the lever L. The jaw $s'$ is inserted in the lever L, provision being made for adjusting it by means of the set-screw $r''$, Fig. 6. The jaw $s''$ is inserted in the pivoted arm $r$, provided with set-screws $r'$. The arm $r$ is pivoted to the lever L at $q'''$, and is caused to swing to and fro to open and close the jaws $s'$ $s''$ by the cam $u'$ on the shaft D. The flange $u$ on this shaft serves to sustain the upper end of the lever L. A spring, $r'''$, opens the jaws $s'$ $s''$, when the cam $u'$ permits—that is, during the return movement of the lever L.

As will be observed in the plan view, Fig. 1, the wire is fed into the machine at an angle with the main shaft B, the object being to present the wire in proper relation to the cutting mechanism, as hereinafter described. The feeding mechanism is arranged at an angle to accomplish this result.

The operation of severing wire into blanks is accomplished by the cutter $e'$, Fig. 4, attached to the reciprocating arm F, actuated by the cam $v'$ on the shaft B. The cutter $e'$ is secured to the inner end of the arm by a set-screw passing through the stirrup $i''$, provision being made to adjust the cutter in the vertical direction by the set-screw $i$. The cutter $e'$ may be adjusted laterally by the set-screw $j''$ $j'''$, Fig. 3. The arm F is forced downward to sever the blank from the wire by the cam $v'$, its return movement being effected by the spring $n'''$, Fig. 4. The cutter $e'$ is adjusted toward the stationary cutting-block $e$ by means of the set-screw $n$, which, for convenience of access to its outer end, may be made to extend through the arm F, as indicated in Fig. 4.

Figure 17:
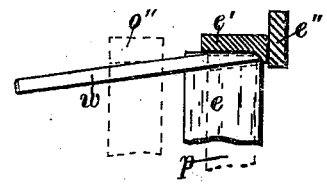
Figure 18:
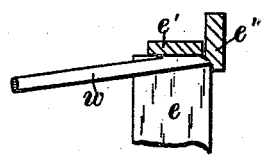
Figure 19:
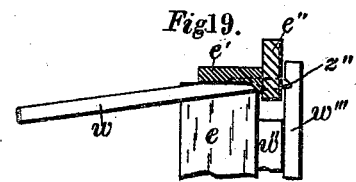
Figure 20:
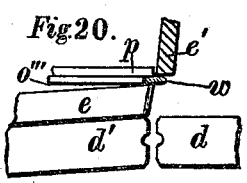

As shown in Fig. 17, which is a horizontal section through the cutter $e'$ and the carrier $e''$, showing the stationary cutting-block $e$ in plan view, the cutter $e'$ is made of a suitable form, adapted to divide the wire into blanks on diagonal lines, substantially as represented in Fig. 23. The stationary cutting-block is inserted in a slot in the frame of the machine, resting on the stationary gripper $d'$. (See Fig. 4.) Provision is made for adjusting the cutting-block and the gripper $d'$ by means of the set-screws $f'$ $f''$, Fig. 4. The cutting-block is held in place by the set-screws $g''$ $g'''$ $h'$ $h'''$, Fig. 1, the points of which bear against its sides and permit lateral adjustment. The inner end of the cutting-block is made of a shape corresponding with that of the cutter, as indicated in Figs. 17, 18, and 19. The gripper $d'$ is held in place by the set-screws $g'$, $h$, and $h''$, Fig. 1, passing through the frame. Above the cutting-block $e$ is placed the plate or supporting-frame N, secured to the frame of the machine by the screws $o$ and $o'$, Fig. 1, and which supports the wire-supporting block $p$ and $o'''$ on one side of the wire and the wire guide or hook $o''$ on the other side. The form of the plate N will be understood from Figs. 9, 10, and 11. The wire guide or hook $o''$ is attached to the lower side of the plate N by means of the set-screw $p'''$, and extends inward over the wire, its inner end being bent down so as to form a hook or lug, which operates to guide the wire and keep it always in contact with the supporting-block $o'''$. The set-screws $q$ and $q'$ serve to adjust the wire-guiding hook $o''$ transversely of the plane of the wire. As indicated in the drawings, Fig. 11, the lower side of the plate is recessed to receive the hook and supporting-block. The hook is shown in side elevation in Fig. 27, and an end view of the same is given in Fig. 26. The wire-supporting blocks are shown in side elevation in Fig. 28, and in end view in Fig. 29. They are attached to the plate N by the screw $p''$, which passes through the upper block, $p$, and enters a threaded hole in the lower block, $o'''$. The function of the supporting-blocks is to sustain the wire in the proper relation with the cutter and cutting-block during the operation of severing the wire, the relative positions of the parts being shown in Figs. 17 and 20.

The set-screw $q''$, Figs. 4, 9, and 10, acts on the outer end of the lower block, $o'''$, and serves to adjust it in position to and from the cutter $e'$. The set-screw $p''$ passes through the upper block, $p$, in a slotted opening, and a pin, $v'''$, inserted in the upper block and fitting a hole in lower surface of the plate N, prevents the block from being pushed inward into the path of the cutter $e'$. As represented in the drawings, and in particular in Fig. 28, the inner end of the upper block, $p$, reaches beyond the lower block, $o'''$, and over the wire. The set-screw $p'$ serves to adjust the blocks $o'''$ and $p$ downward, in case it be necessary to prevent the wire from twisting.

After the blank is severed from the wire it is carried downward on the arm G, Figs. 1, 2, and 3, pivoted to the frame at the centers $m'$ $m''$, and arranged to receive a reciprocating movement at the proper time from a cam, $v$, on the shaft B. The return movement is secured by the spring $n''''$. The carrier $e''$ is adjusted up and down on the inner end of the lever G by means of the set-screw $i'$. It is secured to the lever by a set-screw passing through the stirrup $i'''$, Fig. 3. The carrier may be adjusted laterally by the set-screws $k$ $k'$, Fig. 3. The shape and function of the carrier will be understood from Figs. 13 to 16, inclusive. The blank when cut from the wire is held between the lower end of the carrier and the spring $e'''$ while being carried downward, and inserted between the stationary gripper $d'$ and the movable gripper $d$. As shown in Figs. 1 and 3, the spring $e'''$ extends outward, and is secured to the end of an arm, K, attached to the bed by means of the socket $k''$, provided with a stud which reaches into a lug on the end of the arm, and is held therein by means of the set-screw $k'''$. The spring is held in the socket by the set-screw $l''$. In Figs. 13 and 14 the position of the blank while held between the carrier $e''$ and the spring $e'''$ is represented at $z$. In Fig. 15 the blank, after insertion in the grippers, is shown at $z'$. It will be observed that the lower end of the carrier is provided with a lug or projection, $w'$, which operates, in connection with the movable gripper $d$, to give the requisite bend to the head of the blank, so that the metal is properly distributed for the formation of the head by the heading-die. The lug $w'$ acts as a stop to hold the head of the blank from moving, so that the gripper $d$, on moving toward the stationary gripper $d'$, (see Figs. 21 and 22,) bends the shank of the blank inward and gives the blank a form substantially such as is indicated in Fig. 22, with the head bent over at an angle and adapted to the production of a head located centrally on the shank. The carrier travels upward away from in front of the grippers before the heading-die moves against the head of the blank. The inner end of the spring $e'''$ is moved out of the way by means of the lever $l$, Fig. 3, operated by the cam $v''$, Figs. 1 and 3. The lever is pivoted at $m$, Fig. 3, to the lever G. Fig. 16 shows the relative positions of the carrier $e''$ at the time the wire is fed inward the distance requisite to form the next blank. The extreme upward travel of the spring $e'''$ is limited by the set-screw $f'''$, Fig. 3, inserted in a lug in the frame.

The movable gripper $d$ is carried by the lever E, Figs. 1, 3, and 4, pivoted to the bed on the centers $c''$ $c''$, Fig. 3, and operated by the cam $u'''$, Figs. 1, 3, and 4, on the main driving-shaft B. The lever E is returned by the spring $n''$, Fig. 4. The gripper is held in the lever by means of the set-screw $j$, and it is adjusted forward toward the stationary gripper by the set-screw $f$. The inner ends of the grippers are grooved or given a form adapted to holding the blank and giving its shank the proper shape.

The heading-die is shown at $c'$, Fig. 3. It is attached to the lever J, pivoted at $b''$, Figs. 3 and 4, to the bed, and arranged to receive a reciprocating motion from the crank $a'$ on the main driving-shaft or the fly-wheel H, by means of the connection I and the universal joint $b'$. The heading-die is secured in the lever J by the set-screw $b'''$ in the stirrup $a'''$, Fig. 3, and is adjusted lengthwise by the set-screw $l'$.

The clearer or discharger consists, essentially, of the sliding bar $e'''$, provided with springs on its inner end, in the usual manner, and actuated by the lever $d''$ from a cam fixed on the gear C. The return movement is given to the clearer by means of the spring $l'''$, which also holds it in its proper position. The inward movement of the clearer ejects the finished nail from the grippers.

The lever L of the feeding mechanism is pivoted on a stud, $s$, Fig. 2, inserted in an arm, Q, attached to the frame of the machine.

The flattening-rollers may, if preferred, be located between the feeding mechanism and the wire-guide.

In Figs. 18 and 19 I have represented certain modifications of the construction and arrangement of the cutter and carrier. Thus, in Fig. 18, the cutter $e'$ is made with a straight cutting-edge and shaped so as to act as a cutter to partially effect a division of the wire. In Fig. 19 is shown the method I adopt for shearing off the point of the head of the blank, as is sometimes necessary on small-headed tacks. To effect this result, I attach to the cutting-block $e$ a shear-block, $w'''$, either directly or by the interposition of the packing-piece $w''$. As the cutter $e'$ and carrier $e''$ descend, the point of the blank $z''$ is sheared off on the upper surface of the shear-block $w'''$, which is placed on a level with the top of the cutting-block $e$. By varying the thickness of the packing-piece $w''$ and of the carrier $e''$ any desired amount of metal may be sheared off from the head of the blank.

The travel of the feeding mechanism is limited by the set-screw $s'''$, Fig. 1.

The gripper $d$ is secured in the lever E by means of the set-screw $g$, Fig. 3.

$m'''$ $m''''$, Fig. 1, are the centers on which the lever F is pivoted.

The carrier $e''$ is adjusted by the set-screw $n'$, Fig. 1, which passes the lever G in a manner substantially to that already described and shown in Fig. 4.

I claim—

1. The combination, in a tack-machine, of the flattening-rollers R R, feed mechanism L, wire-guide $o''$, supporting-blocks $o'''$ and $p$, and suitable mechanism adapted to sever the wire on diagonal lines, substantially as described.

2. The combination, in a tack-machine, of the feed mechanism L, wire-guide $o''$, supporting-blocks $o'''$ and $p$, reciprocating cutter $e'$, and stationary cutting-block $e$, adapted to sever the wire on diagonal lines, substantially as described.

3. The combination, in a tack-machine provided with suitable wire-cutting mechanism, of the stationary gripper $d'$, the movable gripper $d$, and the traveling carrier $e''$, having lug or projection $w'$, operating as a stop to secure the bending of the head of the blank by the action of the movable gripper, substantially as described.

4. The combination, with the stationary gripper $d'$, of the movable gripper $d$ and a stop or projection, $w'$, arranged on the same side of the blank with the stationary gripper and operating in connection with the movable gripper to give the proper form to the blank, substantially as described.

5. The combination, with the stationary gripper $d'$ and movable gripper $d$, of the stop $w'$ and blank-holder spring $e'''$, substantially as described.

6. The combination, in a tack-machine, of the stationary cutting-block $e$, stationary gripper $d'$, reciprocating cutter $e'$, and reciprocating carrier $e''$, having lug $w'$, wire-supporting blocks $o'''$ and $p$, and the blank-holding spring $e'''$, substantially as described.

7. The combination, with cutter $e'$ and cutting-block $e$, of the combined cutter and carrier $e''$, adapted to sever the wire on a curved diagonal line, substantially as described.

8. The combination, with the stationary cutting-block $e$, of the cutter $e'$, carrier $e''$, and shear-block $w'''$, substantially as described.

9. The combination, with the stationary cutting-block $e$, of the cutter $e'$, carrier $e''$, shear-block $w'''$, and packing-piece $w''$, substantially as described.

10. The combination, with the cutting mechanism of a tack-machine adapted to sever the wire on diagonal lines, of the feeding mechanism L, arranged to feed the wire at an angle with the plane in which the cutter reciprocates, substantially as described.

11. The combination, with the feeding, cutting, and head-forming mechanism of a tack-machine, of the plate N, having the hook $o''$ and wire-guides $o'''$ and $p$ attached to its lower surface, substantially as described.

LOUIS J. HIRT.

Witnesses:
LEWIS M. LOSS,
GEO. B. SELDEN.